(No Model.) 4 Sheets—Sheet 2.
L. J., H. C. & J. H. HUNTER.
TICKET CONTROLLING APPARATUS.
No. 493,931. Patented Mar. 21, 1893.
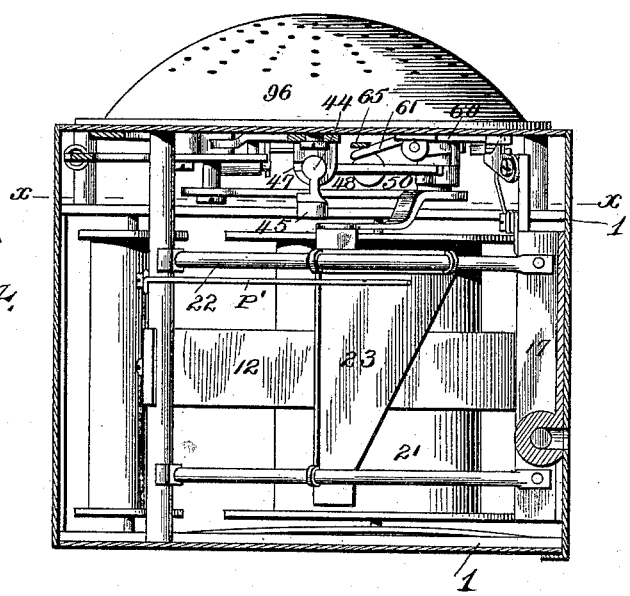
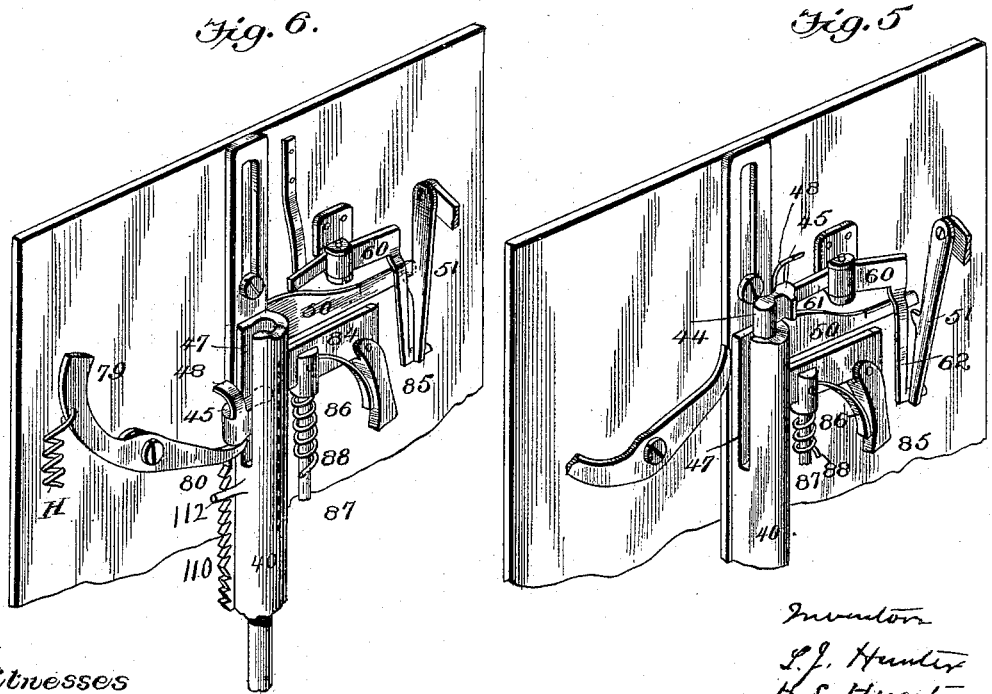

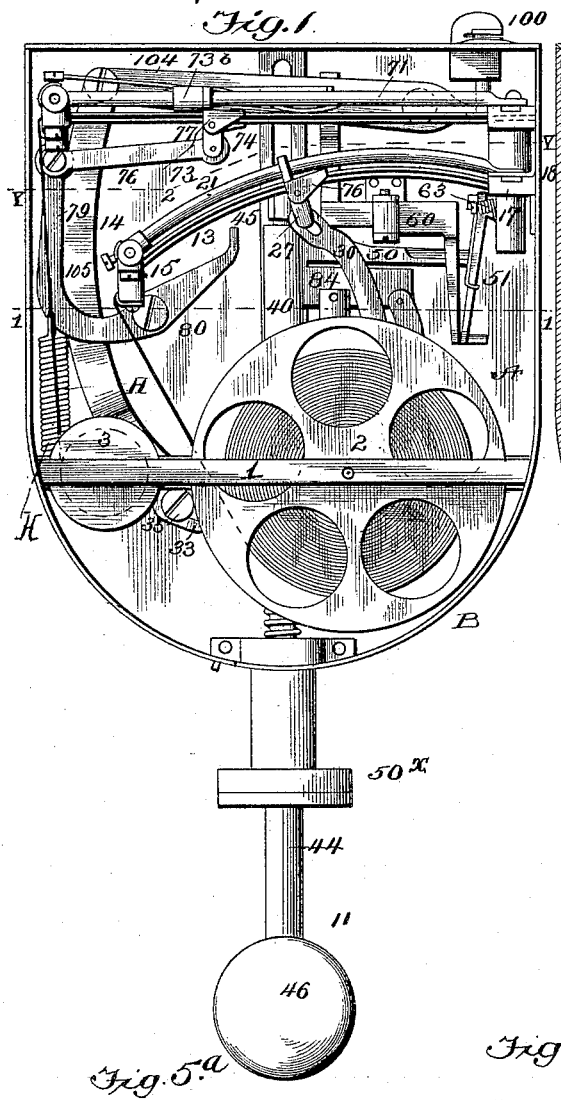

(No Model.) 4 Sheets—Sheet 3.
L. J., H. C. & J. H. HUNTER.
TICKET CONTROLLING APPARATUS.
No. 493,931. Patented Mar. 21, 1893.
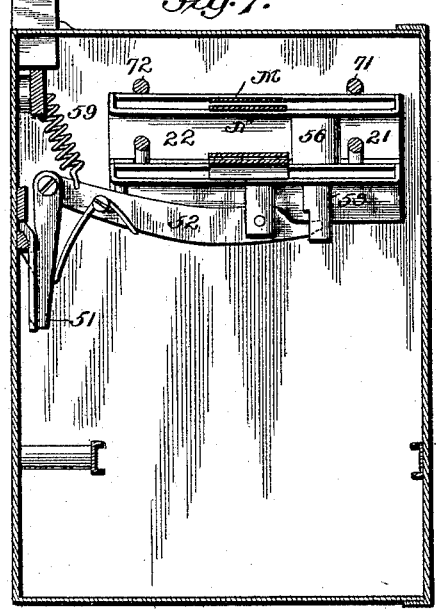
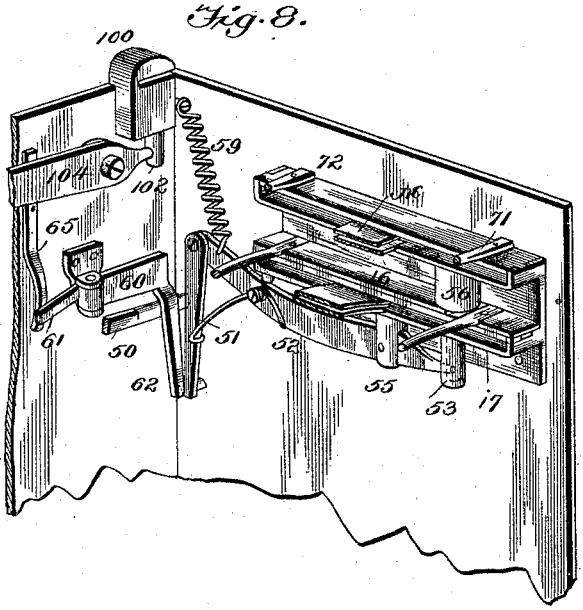
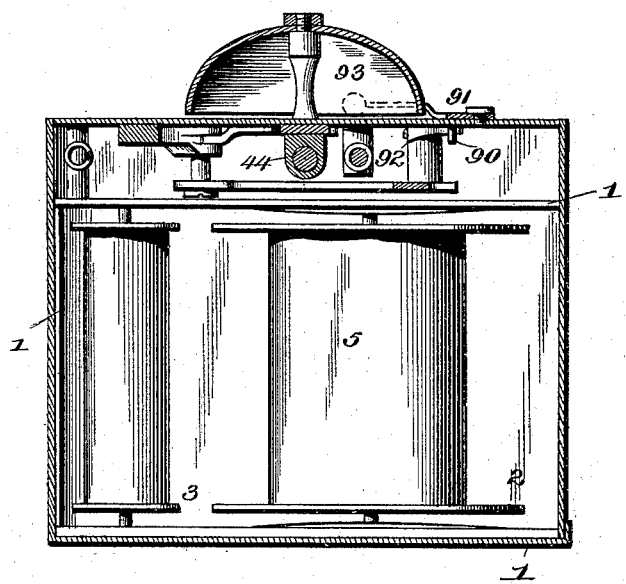
Witnesses:
Inventors:
L. J. Hunter
H. C. Hunter
J. H. Hunter
By W. T. Bartlett
Attorney.
THE NORRIS PETERS CO., PHOTO-LITHO., WASHINGTON, D. C.

(No Model.) 4 Sheets—Sheet 4.
L. J., H. C. & J. H. HUNTER.
TICKET CONTROLLING APPARATUS.
No. 493,931. Patented Mar. 21, 1893.
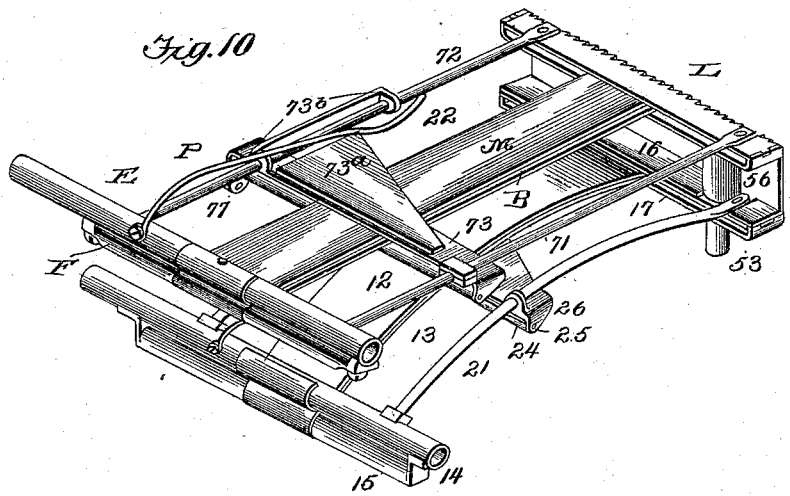
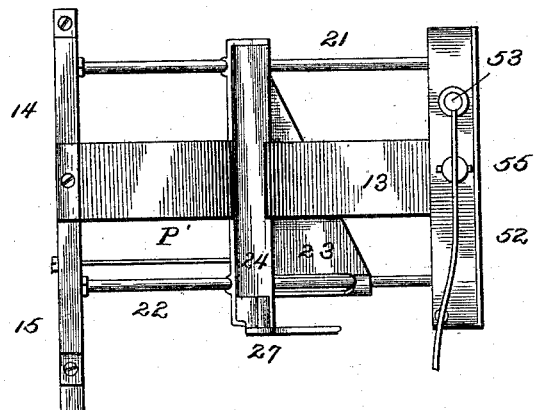
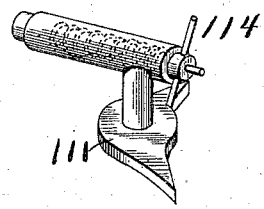
Witnesses
Inventors:
L. J. Hunter
H. C. Hunter
J. H. Hunter
By W. H. Bartlett
Attorney
THE NORRIS PETERS CO., PHOTO-LITHO., WASHINGTON, D. C.

UNITED STATES PATENT OFFICE.

LYTLE J. HUNTER, OF COVINGTON, KENTUCKY, AND HARRY C. HUNTER AND JOSEPH H. HUNTER, OF WINTON PLACE, OHIO.

TICKET-CONTROLLING APPARATUS.

SPECIFICATION forming part of Letters Patent No. 493,931, dated March 21, 1893.

Application filed September 19, 1892. Serial No. 446,316. (No model.)

*To all whom it may concern:*

Be it known that we, LYTLE J. HUNTER, of Covington, Kenton county, Kentucky, and HARRY C. HUNTER and JOSEPH H. HUNTER, residing at Winton Place, in the county of Hamilton and State of Ohio, have invented certain new and useful Improvements in Ticket Transfer, Receipt, and Fare-Controlling Machines, of which the following is a specification, reference being had therein to the accompanying drawings.

This invention relates to ticket transfer, receipt, and fare controlling mechanism, especially intended to be used by conductors on street railways, but applicable to other uses.

The objects of the invention are to produce a mechanical device containing a paper record strip, which strip may be made to indicate one or more of several matters; to enable the operator to project and detach from the machine or device a ticket, receipt, or other detachable piece, which shall indicate a certain thing or things; to provide for the cancellation or non cancellation of said projected piece; to provide for the punching or cancellation of a ticket other than the projected ticket; to arrange a simply operated mechanism by which the functions of the device may be performed; and in general to produce and improve mechanism for the purposes stated.

Figure 1 is a side elevation of a machine embodying the general features of this invention, with side of casing removed. Fig. 2 is a similar view, (with some parts of the operating mechanism removed) on line $x$—$x$, Fig. 4. Figs. 3, $4^a$, $5^a$, are sections showing spindle of operating handle and its springs. Fig. 4 is a cross section on line $y$—$y$, Fig. 1. Figs. 5 and 6 are perspective views of parts of side plate with operating mechanism attached thereto. Fig. 7 is a partial section on line $z\,z$, Fig. 2. Fig. 8 is a partial perspective looking toward the front of the casing. Fig. 9 is a section on line $l$, $l$, Fig. 1, showing bell in section. Fig. 10 is a perspective detail of the paper guiding mechanism detached. Fig. 11 is a bottom plan of part of same mechanism. Fig. 12 is a perspective view of pawl mechanism hereinafter referred to.

A indicates the casing in which the operating mechanism is inclosed. This casing is preferably rectangular in cross section with flat top and arched bottom, and is preferably composed of light metal. The casing has a door B, which opens for the insertion of the reels or webs of paper. Inside the casing a light frame 1 forms a support for two reels or spools 2 and 3, on which reels paper strips are wound. The frame 1 is detachable, so that the spools may be changed. One of the paper strips or webs, is printed or otherwise marked to represent a number of tickets, receipts, transfer slips, or the like, say one thousand tickets, more or less in all. The tickets are consecutively numbered, and preferably the end having the lowest numbers is wound on the shaft 5 or 3 of the reel. The tickets from either reel may be projected from the casing by the operation of a suitable handle, as will be described. The end of the paper web which is wound on spool 3 is carried between guides 12 and 13 and thence between movable jaws, and so to and through a slot in the case. The guides 12 and 13 are preferably light metallic strips, secured near the rear of the casing to bars 14 and 15, which are secured to the casing, in suitable manner. The front ends of these guide strips are attached to plates 16 and 17, which are close to the slot or opening 18 in the front of the casing through which the end of the web is projected. The guide strips 12 and 13 are preferably slightly flexible, and the passage between them is about as wide as the thickness of the paper strip which is used. The guides are arched, as will be explained. Parallel with the arched paper guides, and preferably a little above them, and toward the sides of the casing, are the arched tracks 21, and 22, and these ways are preferably connected to the same supports as the paper guides, and are on concentric curves with said guides. The tracks 21 and 22 pass through holes near the ends of a clamp slide or sliding jaw 23. This slide 23 has a jaw 24 hinged thereto, so that the hinged or pivoted jaw 24 can be closed toward or against sliding jaw 23, or opened away from the same. The slide 23 can be moved along the tracks, following the arch, and the edges of the slide and jaw are cut away where the guides 12, 13 pass between them, so that the jaw may close against the slide at each side of the guides, and will not be held by the guides from doing so. The jaw 24 has its pivots 25 near the rear edge of the jaw, entering sockets 26, in wings which extend downward from the ends of the slide 23. An arm 27 projects from the jaw, in such manner as to form with the jaw a bell-crank lever. An operating lever 30 has its fulcrum in the lower part of the frame, as at 31, and a slot in the upper end of said lever receives a pin 32 projecting from the arm 27 of the jaw. The lever 30 has a rigid arm 33, and a slot 34 near the end of this arm 33 receives a pin 35 which projects from a reciprocating head 36, which head 36 is guided in ways, to move about vertically in the casing. By this connection and combination of parts, the vertical reciprocation of head 36 causes the bell crank lever 30, 33, to rock on its fulcrum, and the engagement of arm 30 of this lever with the arm of jaw 24 rocks said jaw, so that it closes toward or opens away from the slide 23, according to the direction of movement, and then, by an almost continuous movement causes said slide and jaw in closed position to advance along the ways 21, 22 toward the slot in the case, or to open and move away from said slot, according to the direction of the movement of said reciprocating head 36. The curve of the tracks 21, 22 is nearly concentric with the fulcrum 31, to secure best results. The reciprocating head 36 is rigidly connected to a spindle 40. This spindle 40 is hollow. A rod 44 extends through the bore of the spindle, and has a head 45 above the spindle, and a handle 46 below the same. A spring 43 surrounds the rod, and bears against a fixed abutment connected to the casing at one end, and against the spindle at the other end, tending to lift said spindle. The spindle 40 is slotted at its upper end, as shown at 47, Figs. 5 and 6, and an arm 48 projects at one side of rod 44 and connects head 45 to said rod. When the rod is turned so this arm comes opposite slot 47, the rod 44 may be drawn down, and arm 48 will ride down the slot without pulling down the spindle 40. In any other position a downward pull on rod 44 will carry spindle 40 down with it, and by the connections described will work the jaws (or jaw and slide) 23, 24, as has been described. But when spindle 40 is not pulled down the jaws hereinbefore described will not be operated. The draw rod 44 passes through a box 50$^\times$ on the casing and inside the box has a splined or polygonal section, which section passes through a loose collar 51$^\times$. This collar is held in the box against longitudinal movement with the spindle but fits the spline or polygon so as to rotate with the rod. A pin 52$^\times$ projects from the sides of the collar, and springs 53$^\times$ are interposed between their pin and abutments 54 inside the box. The pin 52$^\times$ may ride past the pins 54$^\times$ but the spring is too large to pass said pins. As shown in Figs. 3, 4, 5, the rod may be turned about one fourth of a revolution either to the right or left, from its normal position against the resistance of one or the other of these springs, but the springs will normally turn it back to central position. When turned in one direction to the extreme of its movement, the rod carries arm 48 into register with slot 47, but when the twisting strain is removed the springs turn said arm away from the slot. When the handle 46 is pulled directly downward, from the normal position, the arm 48 engages the end of spindle 40, and pulls said spindle down with it. The spindle 40 carries a rigid arm 50, and a hook 51, is pivoted to lever 52, which lever is suitably fulcrumed in a standard 55 below the plate 17, and has a punch 53 which passes through a hole in said plate 17 as the end of the lever connected to the hook is pulled down. (See Figs. 7 and 8.) Thus when spindle 40 is pulled down, the connections described operate the punch 53 to perforate any slip of paper lying between plates 16 and 17. A wad guide 56 conducts the bits of paper detached by the punch to an opening outside the case. The punch is withdrawn whenever pressure is removed, by spring 59 connected to lever 52 and to the casing. When handle 46 is turned to the right, (Figs. 1, 5,) the arm 48 is carried to a position on the opposite side of rod 40 from the slot 47, and the head 45 projects beyond said rod. When so turned, head 45 engages the rigid arm 61 of a lever 60, which lever is hung on a vertical pivot near the casing. Lever 60 is swung on its pivot by this engagement of head 45, and pendent arm 62 of said lever presses back the hook 51, so that arm 50 before described may move down without engaging said hook, in which case the punch will not be operated by said downward movement. The spring 63 connected to lever 52 and bearing against hook 51, serves to throw the hook into engaging position or to permit it to yield. A spring 65 on the casing restores lever 60 to normal position when free to do so. The upper end of head 45 has an inclined surface, which incline engages arm 61 whenever the hand rises from its position below said arm, so that if the spindle be reciprocated any number of times while the head 45 is swung to the right the lever 60 will be swung with each reciprocation, and the punch 53 will all the time remain inoperative. If handle 46 be turned to the left to its extreme position, and then drawn downward, the arm 48 on rod 44 will be brought into register with the slot 47 in spindle 40, and will thus permit rod 44 to be drawn down without depressing spindle 40 at all, and the connections from spindle 40 will all be inoperative. Now supposing a web of tickets to be wound on spool 5, and the end of the web passes between guides 12, 13, and so between plates 16, and 17, with the end projecting through the slot in the casing. The jaws 23, 24, will normally grasp the web at each side of the guides, when spindle 40 is held in its elevated position. By drawing directly down on handle 46, (in normal position,) the spindle 40 will be depressed, the jaws 23, 24 will be first opened and then carried away from the side of the casing having the slot, and the punch 53 will be actuated to perforate the ticket between plates 16 and 17. When the spindle 40 has made its complete stroke the handle is released, the spring 43 raises the spindle 40, and through the mechanism described the jaws are closed on the web, and then advanced far enough to project the perforated ticket from the casing, when the parts come to rest. If the handle 46 be first turned to the right, and then depressed, the punching mechanism is detached, but the jaws are drawn back, and in moving forward they grasp a ticket, and project it from the jaws. It thus appears that either a perforated or canceled ticket, or an unpunched one may be projected from the casing by one stroke of the reciprocating rod 44, or that said rod may reciprocate without working either device. The vertical movement of head 45 in slot 47, places said head in position to engage the mechanism for feeding tickets from the reel 3, which may be the reel for half fare tickets. This train of mechanism will now be described. A sliding jaw 73 is supported on tracks 71 and 72 which tracks extend from suitable supports E, F, near the rear of the casing to near the front thereof. The tracks are shown to be straight, instead of curved as shown with the lower set of jaws. The sliding jaw 73 is secured to a brace plate 73$^a$ to prevent the cramping of the jaw on the track, and the brace plate has loops 73$^b$ surrounding one of the tracks. A hinged jaw 74 is connected to sliding jaw 73, in the same manner described for the other pair of jaws. This jaw 74 has a rigid arm 77, forming a bell crank lever. Said arm 77 is connected by link 76 with one end 79 of bell crank lever 80, the link being pivotally connected at both ends. The free end of bell crank lever 80 is in the path of movement of head 45, when said head is moving along slot 47. Thus a pull on handle 46, when said handle is turned to the left, pulls down the rod 44, carries arm 48 along slot 47, and leaves the jaws 23 24 and punch 53 at rest, but head 45, engages lever 80, and through this lever closes jaws 74, and then moves jaws 73, 74 along their tracks toward the opening in the side of the casing, and projects the ticket, so that it may be torn off. When the handle 46 is released, a spring H, connected to the lever 80, and to the casing, restores the lever 80, to normal position, and through link 76 opens the jaw 74, and then moves the jaws 73, 74 backward from the slot in the casing, but leaving the sheet at rest. The forward movement of either set of jaws is just enough to project a ticket of the required size from the casing, and said ticket may be torn off when so projected, by drawing it against a suitable set of teeth L, alongside the slots in the casing. Guide plates M, N, direct the web from the spool 2 to the slot in the casing, and the jaws 73, 74 straddle these guide plates, and engage the web at the sides thereof, as has been explained in regard to the other pair of jaws. The guide plates M, B, and the guide plates 12, 13, may be slightly elastic, so as to apply a pressure to the paper strip passing between them. A light spring bearing piece, pawl, or rod, P, extending in the general direction of the guides, bears on the web alongside the guides, and holds the paper from moving back when the jaws move back. A corresponding pawl, P', bears a similar relation to the web operated by the jaws 23, 24. The rod 44 has an arm 84 connected thereto, the rod passing through a hole in said arm and having a collar at each side of said arm. The arm 84 projects through a slot in the side of piston 40, and moves with the rod 44 when said rod moves endwise. Arm 84 has a spring pawl 85, pivoted thereto, and held from swinging in one direction by bearing against said arm. A spring 86 permits said pawl to yield in the other direction. A rod 87 connected to arm 84 serves as a support for spring 88, which spring tends to lift arm 84, and restore the rod 44 to normal position. As pawl 85 is carried down by the downward movement of the rod, its inclined lower end engages a pin 90, which extends through a slot from the outside of the casing. This pin is connected to a clapper arm 91, outside the casing, (shown in dotted lines, Fig. 2.) As the pawl pushes down on this pin it throws back the pivoted clapper arm 91 until the pin 90 rides off from the end of the pawl, when the arm flies back, under the impulse of spring 92, and strikes a blow on the bell alarm 93, (see Fig. 9.) When the pawl 85 rises its spring 86 allows it to yield, so as to ride past the pin 90. Thus it will be seen that when the handle is pulled to reciprocate the rod 44, the alarm will be sounded, whether the ticket be delivered from one or the other reel, and whether it be punched or not. The bell and clapper outside the casing are preferably covered by the perforated dome or shell 96.

It is frequently desirable to punch a ticket for purposes of cancellation, which may not be one of the tickets delivered by the machine. For this purpose a second punch is provided, external to the casing. The fixed anvil 100 outside the casing has a slot 101 in which the side or edge of a ticket may be entered. A punch 102 is guided in the anvil, to reciprocate across the slot therein through a hole in the casing. This punch has a socket in its lower end, into which the end of a lever 104 enters. Lever 104 has its fulcrum on or connected to the casing, and a link 105 is pivoted to said lever, and also to the arm 36 which extends from spindle 40. The pivot 35 which connects arm 36 to lever 33 may also connect the link 105 to lever 104. Then when the spindle 40 and arm 36 move vertically, the punch 102 will be reciprocated, and can be made to cancel a ticket outside the casing. After the movement of the rod 44 has begun, it is desirable that the full stroke be made, so that the jaws shall reciprocate the whole distance, of their throw, and shall move the web forward far enough to project a full sized ticket, and no more. This would be effected were the handle 46 drawn out as far as permissible every time after the movement is begun. But as this full movement might accidently or intentionally be neglected, mechanism has been provided whereby a backward movement of the handle or rod is prevented until the full movement is completed. When spindle 40 begins its downward movement, it should not stop until the stroke is completed. Otherwise only part of the width of a ticket will be projected by the jaw movement.

To insure the full stroke, a stop or detent may be applied to work on the spindle 40. One form of such detent is shown, as follows: Rack teeth 110 on spindle 40 project toward a double pawl 111, which in one position engages the teeth of the rack, to prevent backward movement. Two projecting abutments, 112 and 113, on the spindle, are in position to reverse the pawl, as by engagement with a spring tooth 114 in front of the pawl, although the same thing may be done by direct engagement. When spindle 40 starts on its downward stroke the pawl 111 engages rack 110 and prevents a backward movement until stop 112 reverses the pawl. The backward movement then takes place, and the stop 113 again reverses the pawl at the completion of the backward movement.

We have described our machine in the best form which we have so far invented, but we do not desire to be limited to precise construction, as many modifications have been or may be made which are mechanical equivalents of our device. For instance, we have two sets of jaws, as shown in Figs. 1 and 10 one set moving in the arc of a circle and the other set in a straight line. So we have two punches, and the mechanism by which they are actuated is unlike. The substitution of other equivalent mechanism would be simple, to one skilled in the mechanic arts.

We believe it to be broadly new to actuate a web of paper by reciprocating jaws in substantially the manner described. Also we believe it to be broadly new to actuate one or the other of a plurality of fabricated webs by a single operating handle, so as to project the one or the other at pleasure. Also we believe it to be new to issue from a machine of the general character described, a ticket or transfer token, having one or another mechanical structure, that is, canceled or punched or uncanceled, by the manipulation of a single actuating device.

While we have described the webs of paper as mounted on reels, it will be understood that the term reel is used in a generic sense as applicable to a holding device or holder. The term jaws has been used as applied to the mechanism for clamping and advancing the paper, but this term is also used in a generic sense, and it is apparent that the jaws of themselves require operative connections to produce the desired result.

The natural use of our machine is to deliver a ticket or slip from one of the webs, which acts as a receipt for each fare collected. As the slips are numbered consecutively in the web, the portion of the web remaining on the reels or holder shows at once the fares which have been receipted for. The slip, ticket, or receipt which is projected from the machine may be canceled by the punch or cutter, and thus be held worthless except as a receipt, or it may be issued uncanceled and used as a transfer ticket. Other uses besides the control and indication of street car fares may be made of the machine, as for instance the sale of commodities, the admission of persons to entertainments, and the like.

We claim—

1. In a machine of the general character described, a plurality of holders for webs of paper, a plurality of sets of jaws by which said webs may be projected, and a single operating handle having a plurality of operating connections to engage with and actuate either but not both sets of jaws at the same time, in combination, substantially as described.

2. In a machine of the character described, a plurality of reels for webs of paper, a guide way for each web, a set of jaws reciprocating in the direction of the length of each guide way, and means for closing and projecting one set or the other of the jaws, all in combination substantially as described.

3. In a machine of the character described, a paper holder, a guide way substantially as described leading from near said holder, a pair of jaws capable of reciprocating in the direction of the length of the guide way, and means for closing said jaws and projecting them along the guide way, all combined substantially as described.

4. In a machine of the general character described, a paper holder, a pair of jaws capable of movement toward and from said holder, and means for closing said jaws and reciprocating means substantially as described for them relatively to the holder, in combination substantially as described.

5. In a machine of the general character described, a paper holder, jaws for clamping and advancing the paper from said holder, a handle operatively connected to said jaws, and a cutter in position to be actuated by said handle movement when desirable, all in combination.

6. In a machine of the general character described, the combination of the paper holder, the jaws having a closing and projecting movement substantially as described and the handle operatively connected to the jaws and having a projecting arm, and the punch operating mechanism in the line of movement of said arm, substantially as described.

7. In a machine of the character described, the paper holder and paper advancing mechanism, an operating handle connected to said advancing mechanism to move the same by its reciprocation, a punch and operating mechanism therefor, the handle having an abutment which may be moved to one position to actuate the punch mechanism, and to another position in which the handle and connections operate independently of the punch mechanism, in combination substantially as described.

8. In a machine of the character described, a plurality of paper holders, advancing mechanism in proximity to each holder, and a single operating handle having a plurality of operating connections whereby it may be made to actuate either one of the paper advancing devices without moving the other, in combination substantially as described.

9. In a machine of the character described, a plurality of paper holders, a paper advancing mechanism in proximity to each paper holder, a punching cutter, and a single handle having a plurality of engaging connection, whereby a single complete movement of the handle may be made to actuate one of the paper advancers and the cutter, or the other advancer leaving the first and the cutter at rest, all in combination substantially as described.

10. In a machine of the character described, a plurality of paper holders, advancing jaws in proximity to each holder, a single handle having operative connection to either but not both of the advancing jaws at the same time, and an alarm connected to the handle and actuated by each full movement thereof, all combined substantially as described.

11. In a machine of the character described, a handle and its draw rod, the spindle in proximity to the body of said rod, a head on said rod which may be turned into or out of engagement with said spindle, and a pair of jaws operatively connected to the spindle by lever mechanism, whereby the jaws may be operated by the handle or the handle may be moved without operating the jaws, all in combination substantially as described.

12. In a machine of the character described, the reciprocating rod and handle, the slotted spindle surrounding said rod, the arm on the spindle in position to be turned into said slot, the advancing jaws and their support, and the lever connecting said spindle to the jaw, whereby the jaws may be both closed and advanced, all in combination substantially as described.

13. In a machine of the character described, the combination of the handle and its rod, the spindle surrounding said rod, lever mechanism actuated by said spindle, the jaws operatively connected to said lever mechanism to be closed and advanced thereby, the punch and its operative connections from said spindle, and a projection from the handle whereby the punch may be thrown out of operative relation with the spindle and jaw mechanism, all combined substantially as described.

14. In a machine of the character described the slotted spindle and its supports, the swinging jaws and lever mechanism connecting the spindle and jaws to both close and swing the jaws, the handle and its rod having an arm which may be turned into said slot, and the second set of jaws and lever connections in position to be engaged and actuated by the arm on the handle rod when the same is in the spindle slot, all in combination substantially as described.

15. In a machine of the character described, the spindle and its operative connections to the punch having contact engagement, and the handle having an arm which may be turned into position to disengage said contact while still in position to move the spindle, all combined substantially as described.

16. In a machine of the character described, the spindle 40 having a projecting arm 50, the punch 53 and its operating lever having a hook 51 in position to be engaged by said arm, and the lever 60, supported on the frame in position to be moved to disconnect the hook 51 from arm 50, all combined substantially as described.

17. In a machine of the character described, the punch 53 and lever connected thereto, the spring pressed hook hung to said lever, the lever 60 on the frame in proximity to said hook, the spindle and its arm 50 in position to engage said hook to work the punch, and the handle rod and head 45 in position to actuate the lever to disengage the hook, all combined substantially as described.

18. In a machine of the character described, and in combination with the paper projecting mechanism, a punch extending outside the casing and operatively connected to the paper projecting mechanism, substantially as described.

19. In a machine of the general character described, the casing, a paper holder within the same, the paper advancing mechanism within the casing and the spindle operatively connected thereto, a rigid arm on the spindle, a link connected to said arm, the punch 102 extending into its anvil outside the casing, and the lever 104 and 105 connecting said link to the punch, all combined substantially as described.

20. The spindle 40 and its arm and lever connections as 30 33, the sliding jaw and the swinging jaw to which said lever is connected, and the arched track along which the sliding jaw is guided, all combined in a machine of the character described.

21. The reciprocating spindle 40 and the jaw mechanism operatively connected thereto, the operating rod passing through said spindle and having a head projecting at the side of the spindle, a second set of jaws having operating means in the path of movement of said head on the operating rod, and a spring engaging the operating rod to hold its head normally out of engaging position with the second set of jaw actuating devices, all combined in a machine of the character described.

22. The slotted spindle 40 and the jaw mechanism and punching mechanism operatively connected thereto, the rod 44 passing through said spindle and having an arm projecting at the side thereof and in position to be turned to position to register with the slot, a second set of jaw mechanism in position to be engaged by the arm when so turned, and a spring acting on the rod to retain its arm normally out of the slot in the spindle, all combined in a machine of the general character described.

23. In a machine of the character described, the spindle 40, the jaw mechanism 23 24 operatively connected to said spindle, operating rod 44 and the arm 84 projecting therefrom through a slot in the spindle, the bell and its hammer, and a spring pawl connected to arm 84 in position to actuate said hammer, all combined substantially as described.

24. In a machine of the character described, the handle and its operating rod, the spindle in position to be operatively engaged by said rod and connected to a paper advancing mechanism, the second paper advancing mechanism in position to be engaged by a head on the operating rod when desirable, the arm 84 connected to the operating rod and extending through a slot in the spindle, the bell and hammer, and a pawl on arm 84 in position to actuate the bell hammer, all in combination.

25. In a machine of the character described, a paper holder, a pair of jaws in proximity thereto, and a sliding handle guided to reciprocate in a straight line in the casing and operatively connected to the jaws, whereby the jaws may be closed onto a paper strip and projected a determined distance at a single complete movement of the handle, in combination substantially as described.

26. The spindle 40 and an arm connected thereto, the bell crank lever 30 33 pivotally connected to said arm, the sliding jaw, the jaw pivotally connected to said sliding jaw and operatively engaged by an arm of said bell crank lever, and the handle connected to said spindle whereby the reciprocation of the spindle serves to close the swinging and advance the sliding jaw, all combined in a machine of the character described.

27. The spindle 40 and means to reciprocate the same, a rigid arm connected to said spindle and the bell crank lever 30 33 operatively connected to said arm, the sliding jaw guided by a track and having a swinging jaw pivoted thereto with which jaw the bell crank lever engages, and a spring acting to move the jaws in one direction all combined in a machine of the character described.

28. In a machine of the character described, the casing having a plurality of paper holders, a paper advancer to operate the paper from each holder, and a single handle having an operative attachment in position to engage and operate one paper advancer when the handle is operated from one position, and to disengage the same and operate another advancer when the handle is operated from another position, all combined substantially as described.

29. In a machine of the character described, the casing, the paper holder and jaws for advancing the paper therefrom, a paper cutter, and a handle having operative surfaces which may be thrown into engagement with the jaw operating mechanism and the cutter, or turned away from the same at will, all combined substantially as described.

In testimony whereof we affix our signatures in presence of two witnesses.

LYTLE J. HUNTER.
HARRY C. HUNTER.
JOSEPH H. HUNTER.

Witnesses:
E. H. BAKER,
WM. H. BUCKNER.